(12) United States Patent
Gatti

(10) Patent No.: US 7,856,415 B2
(45) Date of Patent: Dec. 21, 2010

(54) SYSTEM AND METHOD FOR MAPPING EVENTS INTO A DATA STRUCTURE

(75) Inventor: John M. Gatti, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 149 days.

(21) Appl. No.: 11/514,495

(22) Filed: Sep. 1, 2006

(65) Prior Publication Data

US 2008/0059491 A1    Mar. 6, 2008

(51) Int. Cl.
*G06F 7/00* (2006.01)
(52) U.S. Cl. .................. 707/602; 707/755; 707/756
(58) Field of Classification Search ................ 707/100, 707/101, 102, 104.1, 999.1, 999.101, 999.102, 707/602, 755, 756
See application file for complete search history.

(56) References Cited

U.S. PATENT DOCUMENTS

| 5,640,572 | A | 6/1997 | Mondrick et al. |
| 5,771,388 | A | 6/1998 | Mondrick et al. |
| 7,483,901 | B1* | 1/2009 | Massoudi et al. ......... 707/999.1 |
| 2003/0110177 | A1* | 6/2003 | Andrei et al. ............... 707/100 |
| 2003/0140308 | A1* | 7/2003 | Murthy et al. .............. 715/500 |
| 2005/0050068 | A1* | 3/2005 | Vaschillo et al. ........... 707/100 |
| 2007/0156835 | A1* | 7/2007 | Pulkowski et al. .......... 709/207 |
| 2008/0016505 | A1* | 1/2008 | Bucklew et al. ............. 717/174 |

* cited by examiner

*Primary Examiner*—Hosain T Alam
*Assistant Examiner*—Amy Ng
(74) *Attorney, Agent, or Firm*—Baker Botts L.L.P.

(57) ABSTRACT

Translating asynchronous system events into a data structure involves translating the conditional text elements and the dynamic data fields of an event into the predetermined format of a data structure. The conditional text elements and dynamic data fields of the event are parsed until a leaf node is reached for each element or field of the event. The format of the data structure may be maintained in a file that is stored separately from the resulting data structure.

18 Claims, 4 Drawing Sheets

SYSTEM AND METHOD FOR MAPPING EVENTS INTO A DATA STRUCTURE

TECHNICAL FIELD

The present disclosure relates generally to computer systems and information handling systems, and, more particularly, to a system and method for mapping events into a data structure.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

During the operation of an information handling system or computer system, the software and hardware components of the computer system may generate a number of asynchronous events. Each event is typically associated with a data structure that includes a combination of static text and dynamic data values. Many of the data structures associated with an event are in a non-standard format that is not compatible with standardized definitions of management information for computer system environments, such as the Common Information Model (CIM).

SUMMARY

In accordance with the present disclosure, a system and method is disclosed translating asynchronous system events into a data structure. The system and method disclosed herein involves translating the conditional text elements and the dynamic data fields of an event into the predetermined format of a data structure. The conditional text elements and dynamic data fields of the event are parsed until a leaf node is reached for each element or field of the event. The format of the data structure may be maintained in a file that is stored separately from the resulting data structure.

The system and method disclosed herein is technically advantageous because it provides a technique for translating events from a proprietary format to a non-proprietary and predetermined format. Because of this transformation, events can be managed and manipulated within a computer system regardless of the proprietary format of the event. The system and method disclosed herein is also advantageous because the format of the data structure is not written into the code for parsing the event. Instead, the format of the data structure, as defined by a set of translation and processing instructions, is maintained in a file that is separate from the software for performing the parsing operation. The system and method disclosed herein is also advantageous in that it permits computer systems and computer system to operate within standards-based environments without the necessity of rewriting lower level hardware and software elements to compensate for proprietary formats within the standards-based environment, thereby allowing legacy systems to work with standards-based solutions. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
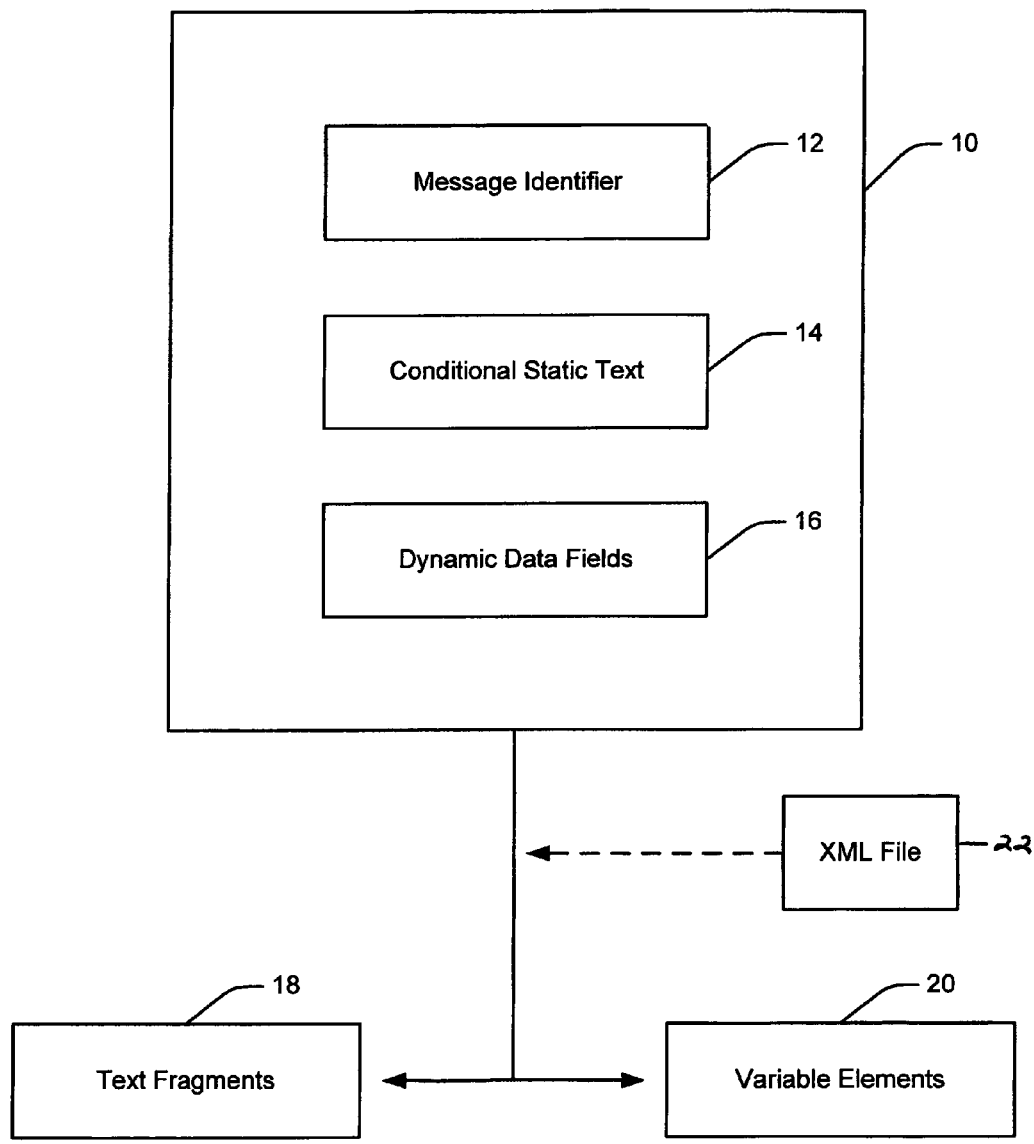
FIG. 1 is a diagram of the data structure of an event.

FIG. 1 is a diagram of the data structure 10 of an event. The event that is represented by data structure 10 may comprise any reported event within a computer system. The data structure 10 for the reported event includes an identifier 12, which is a unique, alphanumeric identifier for the event. Also included in data structure 10 of an event of a computer system or information handling system are conditional static text elements 14 and dynamic data fields 16. Conditional static text elements 14 are text elements that vary depending on a number of factors concerning the event. Dynamic data fields may be numeric, textual, or some combination of numeric and textual elements. As indicated in FIG. 1, the methodology described herein involves a technique for mapping events into a tree data structure that includes text fragments 18 and variable elements 20. As shown in FIG. 1, the format of the tree data structure is maintained in a file 22, such as an XML file, which is maintained separately from either the data structure 10 of the event or the tree data structure that results from the translation and mapping of the event.

Figure 2:
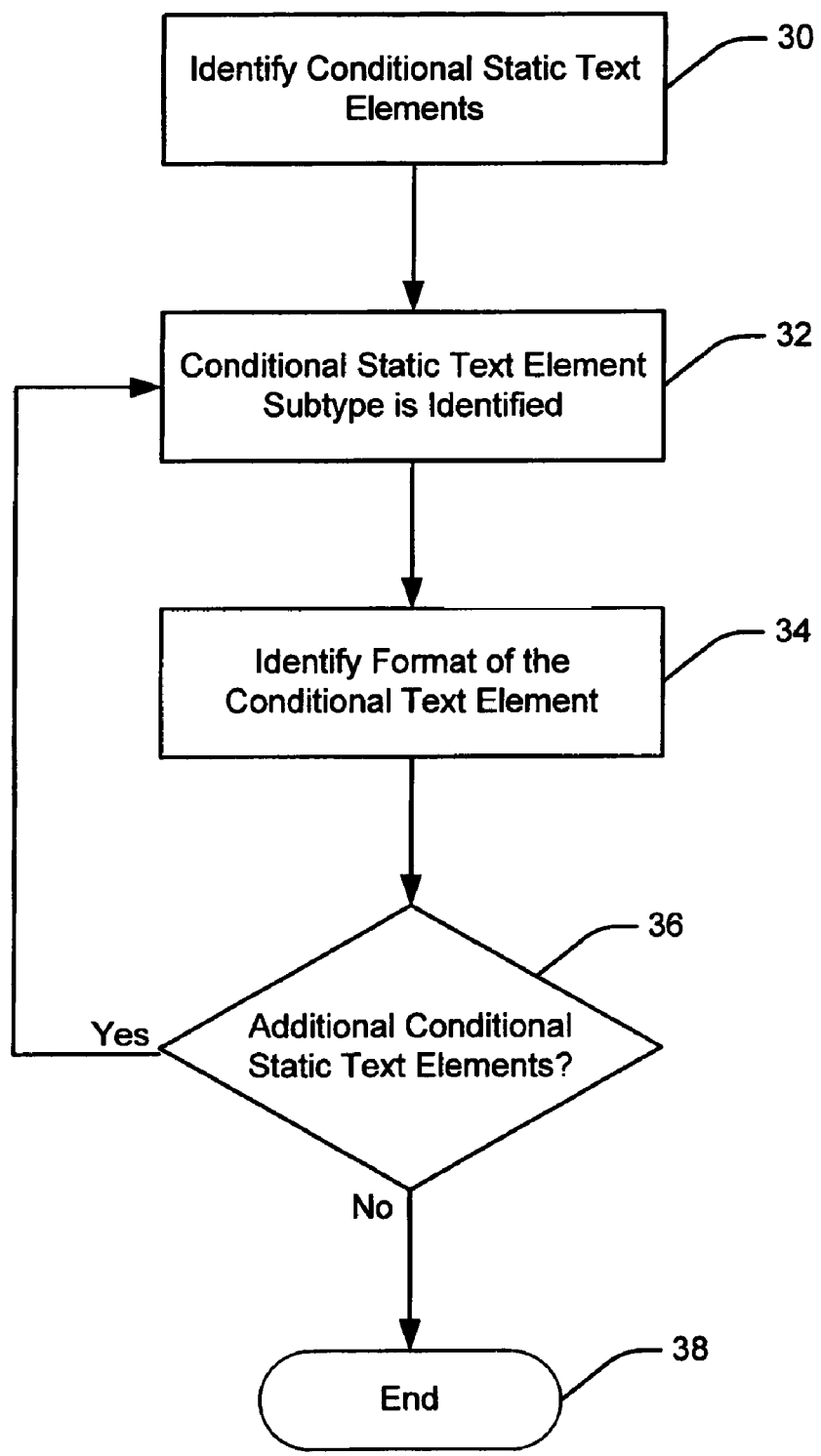
FIG. 2 is a flow diagram of a series of method steps for identifying and parsing conditional text elements.

Shown in FIG. 2 is a flow diagram of a series of method steps for identifying and parsing conditional text elements. Conditional text elements are variable elements in an event that may include a variable text string. At step 30, a conditional text string within the event is identified. Following the identification of the conditional text string, a subtype associated with the conditional text string is identified at step 32. The subtype of a conditional text string identifies the format and range of values expected for the conditional text string. At step 34, the format of the conditional text string is identified. Steps 30, 32, and 34 are performed during a run-time processing operation. Encountering a conditional text string during processing causes the parsing operation to branch to the nested text fragments or variable elements that are within and specified by the conditional text string. At step 36 it is determined if there are additional conditional text elements. These additional conditional text elements may be nested within separate sub-branches of the original conditional text element. If an additional conditional text element is located, processing continues at step 32. If no additional conditional text elements are located, the parsing flow diagram of FIG. 2 concludes at step 38.

Figure 3:
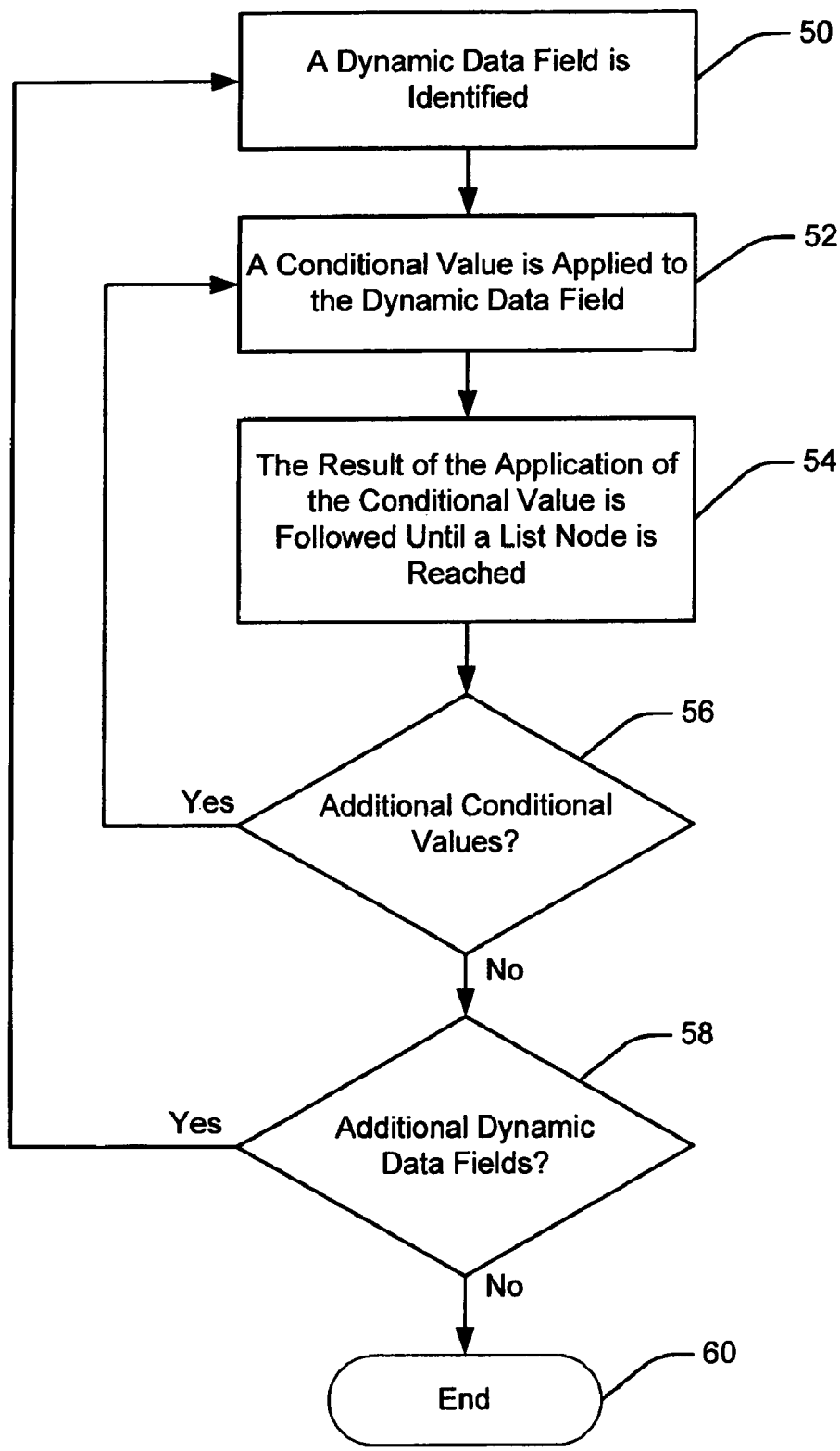
FIG. 3 is a flow diagram of a series of method steps for parsing a dynamic data field.

Shown in FIG. 3 is a flow diagram of a series of method steps for parsing a dynamic data field. At step 50, a dynamic data field is identified. Following the identification of the dynamic data field, a conditional value is applied to the dynamic data field at step 52. At step 54, the result of the application of the conditional value to the dynamic data field is followed by a parsing operation. As part of the parsing operation, the application of the conditional value to the dynamic data field occurs repeatedly until a leaf node is reach in the data structure. As indicated at step 56, steps 52 and 54 are repeated until each conditional value of the dynamic data field has been applied to the dynamic data field and the result of the application of the conditional value is followed by the parsing operation until a leaf node is reached. After the completion of steps 52, 54, and 56 for each conditional value of the dynamic data field, it is determined at step 58 if additional dynamic data fields exist. These additional dynamic data fields may be nested within separate sub-branches of the original dynamic data field. If an additional dynamic data field is located, processing continues at step 50. If no additional dynamic data fields are located, the parsing flow diagram for dynamic data fields concludes at step 60.

The example of FIG. 2 is directed solely to conditional text elements, and the example of FIG. 3 is directed solely to dynamic data fields. It is possible, however, for a dynamic data field to be nested within a conditional text element. Thus, when processing a conditional text element, if a dynamic data field is encountered as a nested element, the processing of the nested element continues according to the method steps set out for the handling of a dynamic data field. It is also possible for a conditional text field to be nested within a dynamic data field element. Thus, when processing a dynamic data field element, if a conditional text element is encountered as a nested element, the processing of the nested element continues according to the method steps set out for the handling of a conditional text element.

Figure 4:
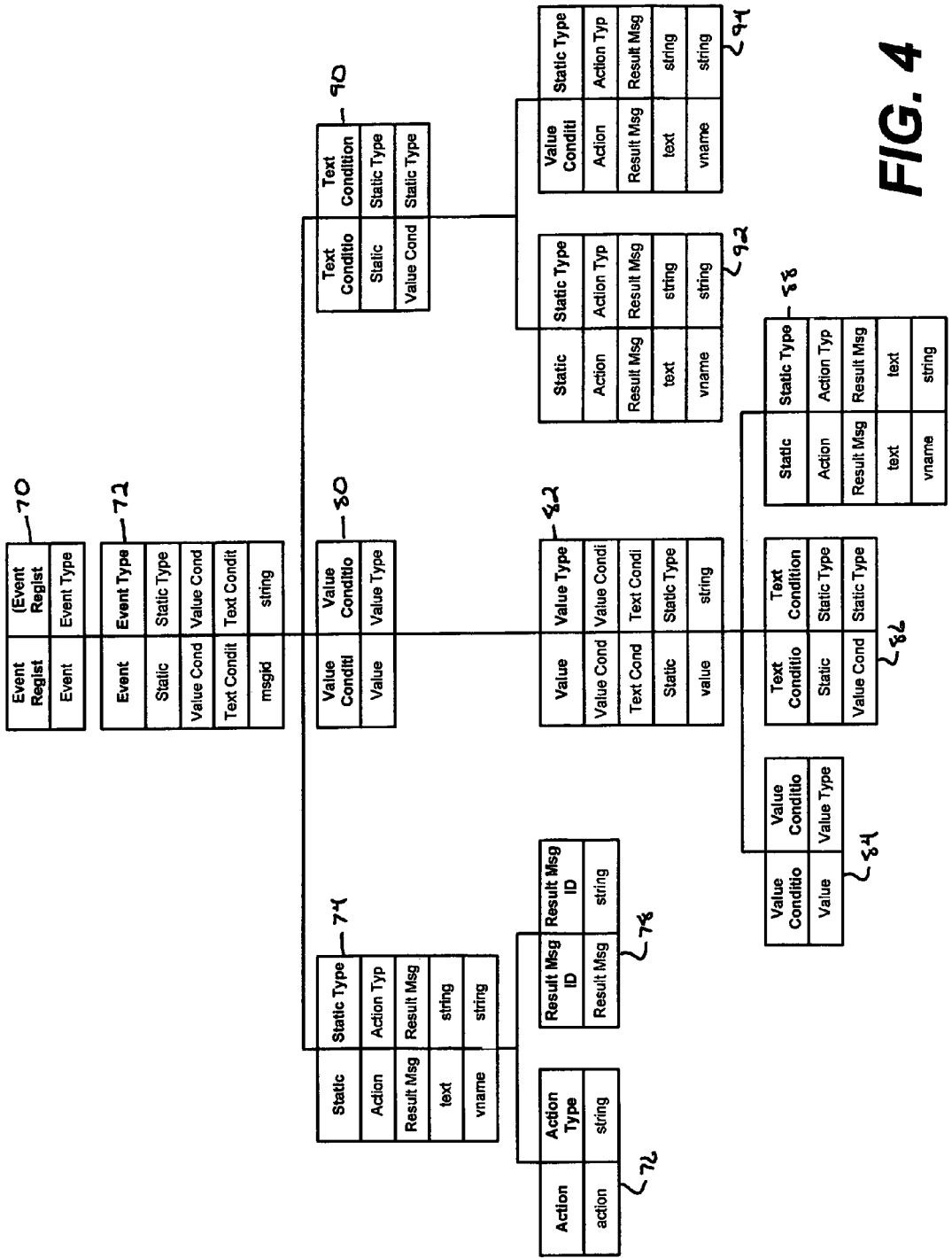
FIG. 4 is a tree structure that depicts an event that has been parsed according to a mapping methodology.

Shown in FIG. 4 is a tree structure that depicts an event that has been parsed according to the mapping methodology disclosed herein. In the tree structure of FIG. 4, the top-level dynamic data field is an Event having an EventType, which is indicated at 70. The Event field can be further subdivided into four other fields in data structure 72. These fields are Static, ValueCond, TextCond, and msgid, which is a non-variable string. The Static variable field is further nested at 74, where the field is subdivided into the following sub-fields: Action, ResultMsg, text, and vname. At 76 and 78, the fields Action and ResultMsg are further nested and terminate in leaf nodes as text strings. Returning to data structure 72, the field ValueCond is further defined as the dynamic value Value at 80. At 82, the dynamic value Value is further nested and defined as fields, ValueCond, TextCond, Static and value, which is a non-variable string. The fields ValueCond, TextCond, and Static are further defined at 84, 86, and 88, respectively. At 90, the TextCond value from data structure 72 is nested and further defined as the values Static and ValueCond, which are themselves further defined at 92 and 94, respectively.

During runtime process of the event message, each branch of the mapped tree structure is followed until a terminating or leaf node is reached. Thus, the parsing of the event message continues until each thread or branch terminates in a leaf node. At the conclusion of the processing of the message event, each leaf node will have created a message identifier and an optional set of processing instructions. The data in each leaf nodes becomes the basis for the relevant data used in any resultant event created from the tree structure. The event mapping method disclosed herein permits the mapping of event messages according to one or more standards without the necessity of rewriting any lower level hardware and event producers. As a result, legacy systems that create events can be used as part of a standards-based solution.

Although the present disclosure has been described in detail, it should be understood that various changes, substitutions, and alterations can be made hereto without departing from the spirit and the scope of the invention as defined by the appended claims.

What is claimed is:

1. A method for mapping an event in a computer system to a tree structure, said method comprising the steps of:

during a run-time processing operation in the computer system, identifying at least one conditional text element of an event during a run-time processing operation in the computer system, wherein the at least one conditional text element comprises variable elements in an event;

identifying a subtype associated with the at least one conditional text element, wherein the subtype identifies a format and a range of values for the associated conditional text element;

branching to nested text fragments and variable elements that are referenced by the at least one conditional text element;

branching within the at least one conditional text element until an associated leaf node is reached with respect to content of the at least one conditional text element;

identifying a dynamic data field during a run-time processing operation in the computer system;

applying conditional values to the dynamic data field to translate the data of the dynamic data field into a predetermined format of a tree structure;

completing repeating the above steps until the at least one with respect to each previously unmapped conditional text element is mapped into the tree structure; and creating a result event from the tree structure.

2. The method for mapping an event in a computer system to a tree structure of claim 1, wherein a format of the event is a non-standard format.

3. The method for mapping an event in a computer system to a tree structure of claim 1, wherein the predetermined format of the tree structure is maintained in a file that is separate from the event or the resulting tree structure.

4. The method for mapping an event in a computer system of claim 1, further comprising the step of following any nested dynamic data fields until the associated leaf node is reached.

5. The method for mapping an event in a computer system of claim 4, further comprising the steps of:

determining if additional conditional values can be applied to the dynamic data field; and if additional conditional values can be applied to the dynamic data field, repeating the steps of applying possible values to the dynamic data field and following any nested dynamic data fields until the associated leaf node is reached with respect to the nested dynamic data fields content.

6. The method for mapping an event in a computer system of claim 5, further comprising the steps of, further comprising the steps of:
   determining if additional dynamic data fields are present in the event; and
   if additional dynamic data fields are present in the event, repeating the steps of applying possible values to the dynamic data field and following any nested dynamic data fields until the associated leaf node is reached for each dynamic data field and each possible conditional value that can be applied to the dynamic data field.

7. The method for mapping an event in a computer system of claim 6, wherein a format of the event is a non-standard format.

8. The method for mapping an event in a computer system to a tree structure of claim 6, wherein the predetermined format of the tree structure is maintained in a file that is separate from the event or the resulting tree structure.

9. The method for mapping an event in a computer system of claim 6,
   wherein a format of the event is a non-standard format; and
   wherein the predetermined format of the tree structure is maintained in a file that is separate from the event or the resulting tree structure.

10. A method for mapping an event in a computer system to a tree structure, said method comprising the steps of:
    during a run-time processing operation in the computer system, identifying a dynamic data field of the event during a run-time processing operation in a computer system, wherein the event comprises data of a proprietary format; applying possible values to the dynamic data field to translate the data of the dynamic data field into a predetermined format of a tree structure and following any nested dynamic data fields until an associated leaf node is reached;
    determining if additional conditional values can be applied to the dynamic data field; if additional conditional values can be applied to the dynamic data field, then repeating the steps of applying the possible values to the dynamic data field and following any of the nested dynamic data fields until the associated leaf node is reached;
    creating a result event from the tree structure;
    identifying a conditional text element of the event;
    identifying a subtype associated with the conditional text element;
    branching to nested text fragments and variable elements that are referenced by the conditional text element;
    branching within each conditional text element until the associated leaf node is reached with respect to a content of the conditional text element; and
    completing repeating the above steps with respect to each previously unmapped conditional text element in the tree structure until each conditional text element is mapped.

11. The method for mapping an event in a computer system to a tree structure of claim 10, further comprising the steps of:
    determining if additional dynamic data fields are present in the event; and
    if additional dynamic data fields are present in the event, then repeating the steps of applying possible values to the dynamic data field and following any nested dynamic data fields for each of the additional dynamic data fields until the associated leaf node is reached for each of the additional dynamic data fields and each possible conditional value that can be applied to each of the additional dynamic data fields.

12. The method for mapping an event in a computer system to a tree structure of claim 10, wherein a format of the event is a non-standard format.

13. The method for mapping an event in a computer system to a tree structure of claim 10, wherein the predetermined format of the tree structure is maintained in a file that is separate from the event or the resulting tree structure.

14. The method for mapping an event in a computer system to a tree structure of claim 10,
    wherein a format of the event is a non-standard format; and
    wherein the predetermined format of the tree structure is maintained in a file that is separate from the event or the resulting tree structure.

15. A method for mapping an event in a computer system to a tree structure, said method comprising the steps of:
    during a run-time processing operation in the computer system, identifying at least one conditional text element of an event during a run-time processing operation in a computer system, wherein the at least one conditional text element comprises variable elements in an event;
    identifying a subtype associated with the conditional text element, wherein the subtype identifies a format and a range of values for the associated conditional text element;
    branching to nested text fragments and variable elements that are referenced by the conditional text element;
    branching within each conditional text element until an associated leaf node is reached with respect to content of the conditional text element;
    identifying a dynamic data field of the event, where in the event comprises data of a proprietary format;
    applying possible values to the dynamic data field to translate the data of the dynamic data field into a predetermined format of a tree structure and following any nested dynamic data fields until the associated leaf node is reached; and
    creating a result event from the tree structure.

16. The method for mapping an event in a computer system to a tree structure of claim 15, wherein a format of the event is a non-standard format.

17. The method for mapping an event in a computer system to a tree structure of claim 15, wherein the predetermined format of the tree structure is maintained in a file that is separate from the event or a resulting tree structure.

18. The method for mapping an event in a computer system to a tree structure of claim 15,
    wherein a format of the event is a non-standard format; and
    wherein the predetermined format of the tree structure is maintained in a file that is separate from the event or the resulting tree structure.

* * * * *